United States Patent
Lee et al.

(10) Patent No.: US 9,763,180 B1
(45) Date of Patent: Sep. 12, 2017

(54) PEER-TO-PEER WIRELESS DEVICE COMMUNICATION OVER A WIRELESS LOCAL AREA NETWORK

(71) Applicant: Sprint Communications Company L.P., Overland Park, KS (US)

(72) Inventors: Young Suk Lee, Philadelphia, PA (US); Raymond Emilio Reeves, Oviedo, FL (US); Gregory Anderson Drews, Los Angeles, CA (US); Brian D. Farst, Hollywood, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 484 days.

(21) Appl. No.: 14/202,961

(22) Filed: Mar. 10, 2014

(51) Int. Cl.
   *H04W 84/12* (2009.01)
   *H04W 48/18* (2009.01)
   *H04W 84/04* (2009.01)

(52) U.S. Cl.
   CPC .......... *H04W 48/18* (2013.01); *H04W 84/04* (2013.01); *H04W 84/12* (2013.01)

(58) Field of Classification Search
   CPC ...... H04W 48/18; H04W 84/04; H04W 84/12
   See application file for complete search history.

(56) References Cited

U.S. PATENT DOCUMENTS

| | | |
|---|---|---|
| 8,798,617 B1 | 8/2014 | Cole |
| 2011/0082939 A1 | 4/2011 | Montemurro et al. |
| 2011/0103264 A1 | 5/2011 | Wentink |
| 2012/0265996 A1 | 10/2012 | Kaal |

(Continued)

FOREIGN PATENT DOCUMENTS

| | | |
|---|---|---|
| EP | 1933534 | 6/2008 |
| EP | 2484172 | 4/2011 |

(Continued)

OTHER PUBLICATIONS

Wi-Fi Alliance, 'Wi-Fi Peer-to-Peer (P2P) Technical Specification', Draft Version 1.14, 2010, pp. 1-154.*

(Continued)

*Primary Examiner* — Melvin Marcelo

(57) ABSTRACT

Embodiments disclosed herein provide systems, methods, and computer readable media for providing peer-to-peer wireless device communication over a wireless local area network. In a particular embodiment, a method of operating a wireless communication device in communication with a wireless wide area communication network (WWAN) and a wireless local area communication network (WLAN) is provided. The method includes receiving a request from a user to initiate a communication with a second wireless communication device and determining whether the second wireless device is in communication with the WLAN. Upon determining that the second wireless device is in communication with the WLAN, the method provides establishing the communication with the second wireless device as a peer-to-peer communication over the WLAN. Upon determining that the second wireless device is not in communication with the WLAN, the method provides establishing the communication with the second wireless device over the WWAN.

20 Claims, 9 Drawing Sheets

(56) References Cited

U.S. PATENT DOCUMENTS

2012/0266217 A1 10/2012 Kaal et al.
2013/0148642 A1* 6/2013 Abraham .............. H04W 8/005
370/338

FOREIGN PATENT DOCUMENTS

WO 2011039719 4/2011
WO 2013102322 7/2013

OTHER PUBLICATIONS

Dan Balaban; "Making P2P Connections Easier: NFC Forum Published New Standard," NFC Times; Sep. 29, 2011; pp. 1-9; http://nfctimes.com/news/making-p2p-connection-easier-nfc-forum-publishes-new-standard.
"Near Field Communication," Wikipedia; Mar. 10, 2014; 1 page; http://en.wikipedia.org/wiki/Near_field_communication.

* cited by examiner

PEER-TO-PEER WIRELESS DEVICE COMMUNICATION OVER A WIRELESS LOCAL AREA NETWORK

TECHNICAL BACKGROUND

Many modern wireless communication devices are capable of communicating with wireless wide area communication networks (WWANs) in addition to wireless local area communication networks (WLANs). A connection to a WWAN may be used when a wireless device is not within range or is otherwise not connected to a WLAN. A WLAN may be preferred for communications because the WLAN is faster than WWAN, less expensive to access than the WWAN, less congested than the WWAN, or for any other reason why a device may prefer a WLAN over a WWAN.

Typically, a wireless device will exchange data communications over a WLAN but will still use a WWAN to exchange phone calls. Some devices are capable of using a WLAN to exchange phone calls as though they are being exchanged over a WWAN, however, those call communications must still be routed through the core network of the WWAN. Therefore, even if two devices were capable of WLAN calling and were on the same WLAN, a call established from one of the two devices would still have to route though the core WWAN before reaching the other device.

OVERVIEW

Embodiments disclosed herein provide systems, methods, and computer readable media for providing peer-to-peer wireless device communication over a wireless local area network. In a particular embodiment, a method of operating a wireless communication device in communication with a wireless wide area communication network (WWAN) and a wireless local area communication network (WLAN) is provided. The method includes receiving a request from a user to initiate a communication with a second wireless communication device and determining whether the second wireless communication device is in communication with the WLAN. Upon determining that the second wireless communication device is in communication with the WLAN, the method provides establishing the communication with the second wireless communication device as a peer-to-peer communication over the WLAN. Upon determining that the second wireless communication device is not in communication with the WLAN, the method provides establishing the communication with the second wireless communication device over the WWAN.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
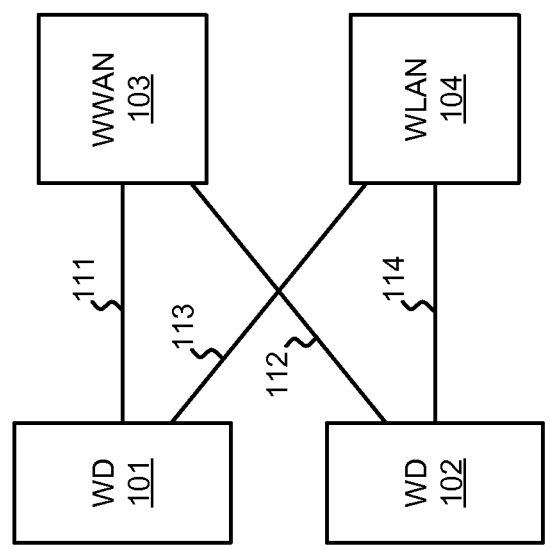
FIG. 1 illustrates a wireless communication system for providing peer-to-peer wireless device communication over a wireless local area network.

FIG. 1 illustrates wireless communication system 100. Wireless communication system 100 includes wireless communication device 101, wireless communication device 102, wireless wide area network (WWAN) 103, and wireless local area network (WLAN) 104. Wireless communication device 101 and WWAN 103 communicate over wireless link 111. Wireless communication device 102 and WWAN 103 communicate over wireless link 112. Wireless communication device 101 and WLAN 104 communicate over wireless link 113. Wireless communication device 102 and WLAN 104 communicate over wireless link 114.

In operation, wireless communication devices 101-102 are capable of exchanging communications with WWAN 103 and WLAN 104. WWAN 103 provides voice, text, data, and/or any other type of service to wireless devices 101-102 using various wide area wireless voice and data protocols. WLAN 104 provides data networking communication service to wireless devices 101-102 using a wireless local area networking protocol. Specifically, WLAN 104 at least provides a means of wirelessly exchanging data communications between devices connected thereto. WLAN 104 may, but need not, also provide access to the Internet for connected devices.

Figure 2:
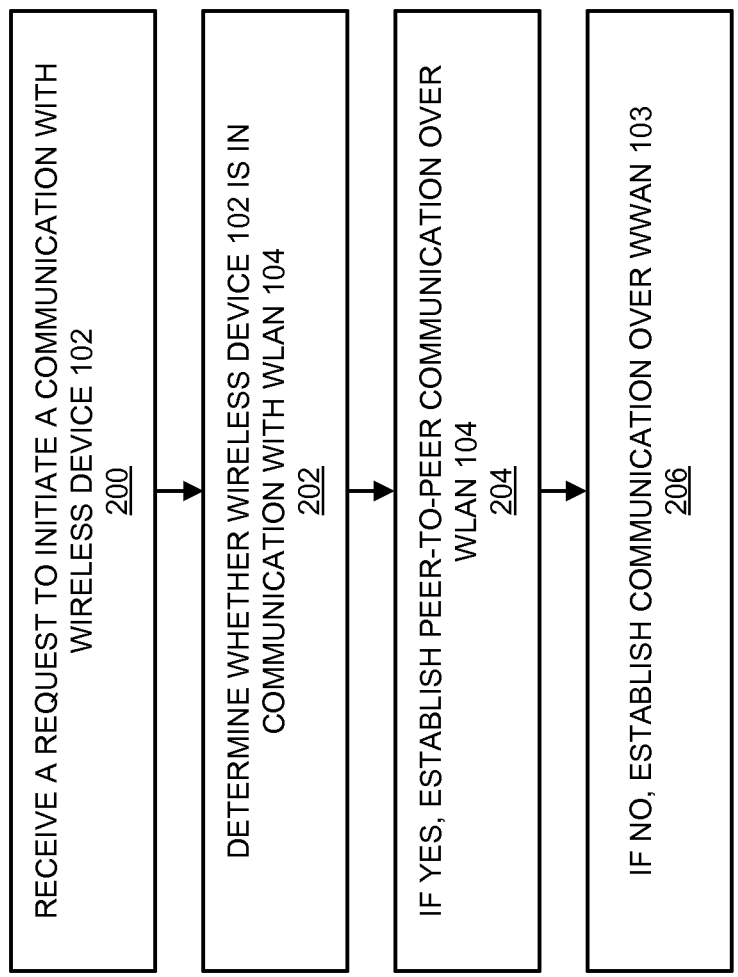
FIG. 2 illustrates an operation of the wireless communication system to provide peer-to-peer wireless device communication over a wireless local area network.

FIG. 2 illustrates the operation of wireless communication system 100 to provide peer-to-peer wireless device communication over a wireless local area network. Wireless device 101 is in communication with WWAN 103 and WLAN 104. Wireless device 101 receives a request from a user to initiate a communication with a wireless device 102 (step 200) and determines whether wireless device 102 is in communication with WLAN 104 (step 202). Upon determining that wireless device 102 is in communication with WLAN 102, wireless device 101 establishes the communication with wireless device 102 as a peer-to-peer (P2P) communication over WLAN 104 (step 204). Upon determining that wireless device 102 is not in communication with WLAN 104, wireless device 101 establishes the communication with wireless device 102 over WWAN 104 (step 206).

The request may be received from the user in a variety of ways. For example, the user may enter a directory number (or other identifier) for wireless device 102 into a user interface of wireless device 101, the user may select device 102 from a contact directory via the user interface of wireless device 101, or any other way in which a wireless device user can initiate a communication with another device. The communication may be any type of communication that may be exchanged between two communication devices, such as voice, image, video, text, data, or some other type of communication—including combinations thereof.

Advantageously, if wireless device 102 is in communication with WLAN 104 along with wireless device 101, then the communication is established between the two devices in a P2P configuration over WLAN 104 without having to route the communication through WWAN 103. Resources of WWAN 103 are therefore not used to carry the communication between wireless device 101 and wireless device 102.

Referring back to FIG. 1, wireless communication devices 101-102 each comprises Radio Frequency (RF) communication circuitry and at least one antenna. The RF communication circuitry typically includes an amplifier, filter, modulator, and signal processing circuitry. Wireless communication devices 101-102 may each also include a user interface, memory device, software, processing circuitry, or some other communication components. Wireless communication devices 101-102 may each be a telephone, computer, e-book, mobile Internet appliance, wireless network interface card, media player, game console, or some other wireless communication apparatus—including combinations thereof.

WWAN 103 comprises network elements that provide communications services to wireless devices 101-102 via one or more wireless access nodes. WWAN 103 may comprise switches, wireless access nodes, Internet routers, network gateways, application servers, computer systems, communication links, or some other type of communication equipment—including combinations thereof. While illustrated as a single wireless network, WWAN 103 may include wireless networks operated by different network operators. Accordingly, wireless devices 101-102 may exchange communications with wireless networks run by different operators when exchanging communications with WWAN 103.

WLAN 104 comprises network elements that provide local area networking services to wireless devices 101-102 over a limited area via one or more wireless access nodes. WWAN 103 may comprise switches, wireless access nodes, routers, network gateways, application servers, computer systems, communication links, or some other type of communication equipment—including combinations thereof.

Wireless links 111-114 use the air or space as the transport media. Wireless links 111-112 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), High Speed Packet Access (HSPA), or some other wireless communication format. Wireless links 113-114 may use various wireless networking protocols, such as Wireless Fidelity (WIFI) or any other type of wireless local area networking protocol—including combinations thereof.

Figure 3:
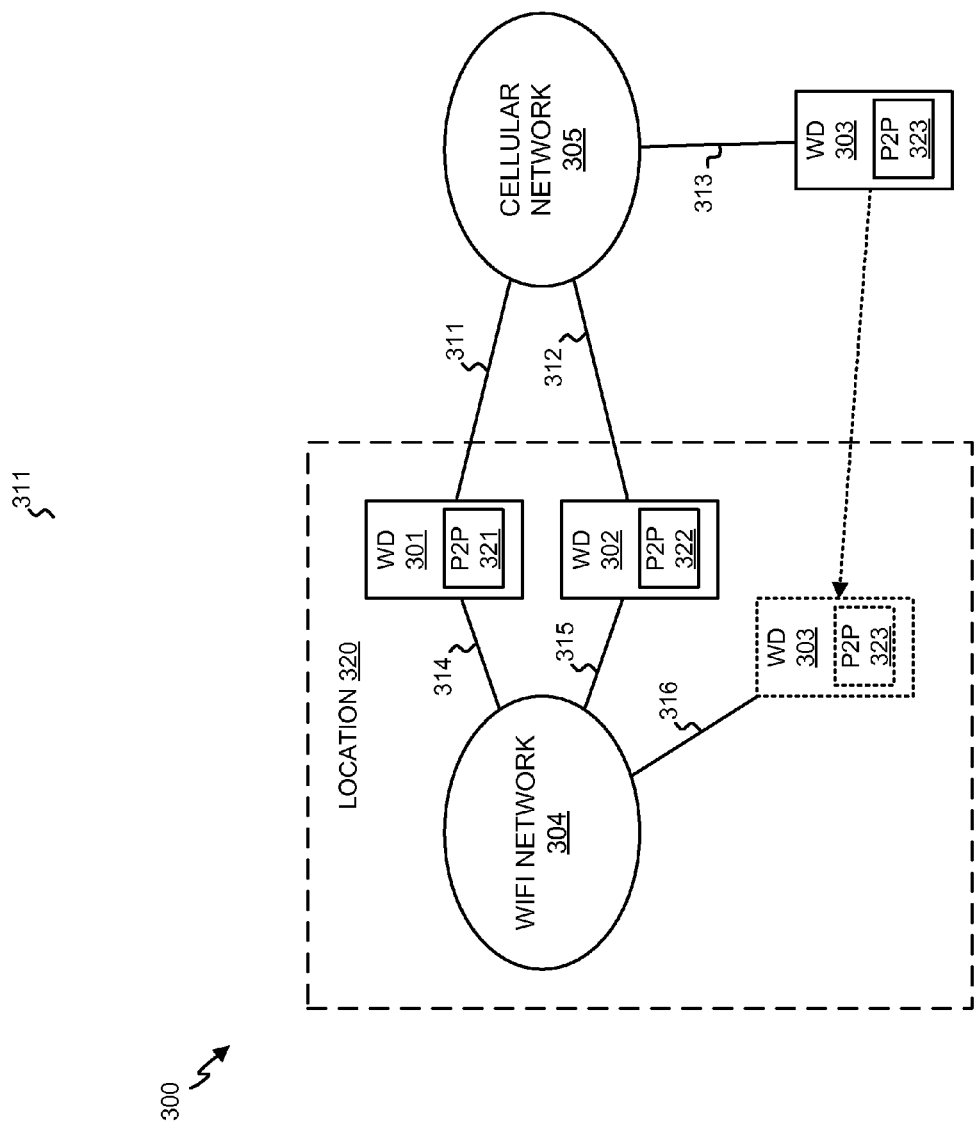
FIG. 3 illustrates a wireless communication system for providing peer-to-peer wireless device communication over a wireless local area network.

FIG. 3 illustrates wireless communication system 300. Wireless communication system 300 includes wireless communication devices 301-303, WIFI network 304, and cellular network 305. Wireless devices 301-303 include P2P communication modules 321-323, respectively. Wireless devices 301-303 and WIFI network 304 communicate over wireless links 314-316, respectively. Wireless devices 301-303 and cellular network 305 communicate over wireless lines 311-313, respectively.

In operation, wireless devices 301-303 are capable of communicating with both cellular network 305 and WIFI network 304. Cellular network 305 has a much larger coverage area than does a WIFI network. For example, a single cellular base station may cover an area measured in square miles and cellular network 305 may include multiple base stations. In contrast, a wireless access node for WIFI network 304 covers a radius measured in tens to hundreds of feet depending on obstacles impeding the signal path. While WIFI network 304 may include multiple wireless access nodes to expand coverage, the area covered by WIFI network 304 is likely much smaller than that covered by cellular network 305.

Specifically, in this embodiment, WIFI network 304 comprises enough access nodes to essentially cover the area of location 320. Location 320 may be a building, collection of buildings, park, stadium, shopping center, or any other way in which a location may be designated. Cellular network 305 also provides wireless coverage to location 320 but, unlike WIFI network 320, cellular network 305 provides coverage to areas outside of location 320 as well.

Figure 4:
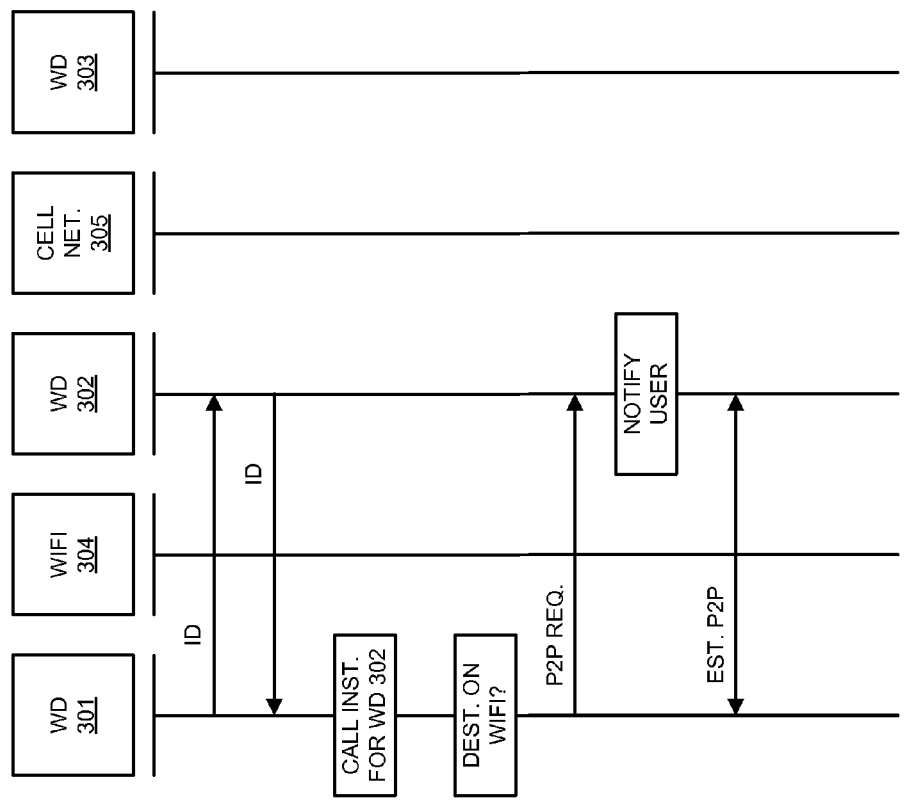
FIG. 4 illustrates an operation of the wireless communication system to provide peer-to-peer wireless device communication over a wireless local area network.

FIG. 4 is a sequence diagram illustrating an operation of wireless communication system 300 to provide peer-to-peer wireless device communication over a wireless local area network. When wireless devices 101 and 102 are within location 320, wireless devices 101 and 102 connect to WIFI network 304. Upon connecting, P2P modules 321 and 322 recognize that their respective wireless devices have connected to a WIFI network and direct each device to broadcast identification information to other devices on the network. The P2P modules 321-323 may be software modules executing on wireless devices 301-303 as stand alone applications, integrated into operating software for wireless device 301-303, or otherwise executable on wireless devices 301-303. The identification information may be broadcasted using any networking protocol, such as a Universal Plug and Play (UPnP) protocol, that is capable of being carried over a WIFI network. The identification information for a wireless device may include a phone number for the wireless device, a media access code (MAC) for the wireless device, a network address for the wireless device, a wireless device nickname, or any other information that identifies a particular wireless device—including combinations thereof.

While only wireless devices 301 and 302 are shown in this example, other wireless devices may be connected to wireless network 304 that also receive the broadcasted identification information. Similarly, when other devices with P2P modules join WIFI network 304, the P2P modules in those devices direct the devices to broadcast identification information to other devices on network 304. Upon receiving the identification information for another device, P2P module 321 instructs wireless device 301 to store that information or otherwise stores an indication that the other device is located on WIFI network 304. Thus, wireless device 301 and any other device on wireless network 304 maintains information about which P2P capable devices are on WIFI network 304.

In some embodiments, since wireless devices typically are unable to anticipate when they will disconnect from a wireless network, the information indicating that a particular wireless device is on network 304 may expire after a predetermined period of time (e.g. 10 minutes). Thus, in order for wireless devices to ensure information about their presence on WIFI network 304 does not expire on other devices, P2P modules will instruct wireless devices to rebroadcast their identification information before the predetermined period of time elapses since the identification information was last broadcasted. Additionally, whenever a new device joins the network and broadcasts its identification information, the other devices may rebroadcast their identification information in order to inform the new device of their presence.

Wireless device 301 receives an instruction from a user to establish a voice call with wireless device 302. The instruction may be input by the user into a phone call application, such as a dialer application, executing on wireless device 301. For example, the user may dial a phone number of wireless device 302 or otherwise indicate that the phone number of wireless device 302 should be called, such as by indicating the phone number of wireless device 302 from an address book application. Before wireless device 301 is able to initiate the call over cellular network 305, P2P module 321 determines whether the phone number of wireless device 302 corresponds to a device currently communicating with WIFI network 304. P2P module 321 therefore determines whether the phone number corresponds to identification information received from other wireless devices on WIFI network 304.

In this example, P2P module 321 determines that the identification information broadcast from wireless device 302 corresponds to the phone number received from the user. Accordingly, instead of allowing wireless device 301 to initiate a call with wireless device 302 over cellular network 305, P2P module 321 instructs wireless device 301 to establish a P2P communication for the call over WIFI network 304. Specifically, P2P module 321 transfers a request over WIFI network 304 to wireless device 302. In this example, the identification information received from wireless device 302 may indicate an address to which communications for wireless device 302 should be directed on WIFI network 304. Upon wireless device 302 receiving the P2P request, P2P module 322 processes the P2P request and notifies a user of wireless device 302 that a call is incoming from wireless device 301.

To notify the user, P2P module 322 may instruct a phone application on wireless device 302 to notify the user by instructing wireless device 302 to sound a ringtone, vibrate, display an incoming call alert on a screen, or some other method of notifying a user of an incoming call—including combinations thereof. In some examples, the notification may include an indication that the incoming communication is a P2P communication rather than a communication over cellular network 305.

Upon the user of wireless device 302 indicating acceptance of the communication, P2P modules 322 and 321 instruct wireless devices 302 and 301, respectively, to establish a the voice call over WIFI network 304. The P2P call may be established using any P2P communication protocol that is capable of being transmitted over a WIFI network. For example, the voice communications from one device may be converted into data packets for transmission to the other device over WIFI network 304.

In another example, the user of wireless device 302 may reject the call request or otherwise not answer the call request. At which time, P2P module 322 may instruct wireless device 302 to send a notification to wireless device 301 that the call has been rejected and wireless device 301 stops attempting to establish the call. Alternatively, P2P module 322 may connect the call to voicemail. In some examples, P2P module 322 may facilitate the playing of a greeting over a P2P connection to wireless device 301 and recording of the voicemail message on a local storage within wireless device 302. In other examples, P2P module 322 may redirect the communication to cellular network 305 from WIFI network 304 (possibly over the Internet) so that a voicemail system on cellular network 305 can facilitate the voicemail process.

Advantageously, the above method allows the users of wireless devices 301 and 302 to operate their respective devices as they normally would to establish a call over cellular network 305. However, P2P modules 321 and 322 work in the background to route communications over WIFI network 304 if possible so that, once a call is established, the call does not need to use resources of cellular network 305.

It should be understood that, since the above example uses a phone number for wireless device 302 to identify wireless device 302, the identification information broadcast by wireless device 302, unless otherwise correlated to the phone number within P2P module 321, would have to indicate wireless device 302's phone number so that P2P module 321 can identify wireless device 302 as being on WIFI network 304. Other forms of identification may also exist. Therefore, in general, in order for a P2P module on a wireless device to identify another device on WIFI network 304, the identification information broadcasted by other wireless devices must somehow correspond to information that is otherwise available to the P2P module.

For example, wireless device 301 and wireless device 302 may have previously communicated and exchanged MAC addresses. Thus, wireless device 301 may store a MAC address associated with wireless device 302. Accordingly, the identification information from wireless device 302 may include the MAC address of wireless device 302 and not the phone number of wireless device 302 (although other embodiments may include both). In such an example, upon the user identifying wireless device 302, either by phone number, MAC address, or otherwise, P2P module 321 can determine the previously stored MAC address for wireless device 302 and determine that wireless device 302 is located on WIFI network 304 based on that MAC address. If for whatever reason, P2P module 321 does not know the MAC address of wireless device 302, then P2P module 321 will not be able to determine that the device with which the user wishes to establish communication is located on WIFI network 304.

Figure 5:
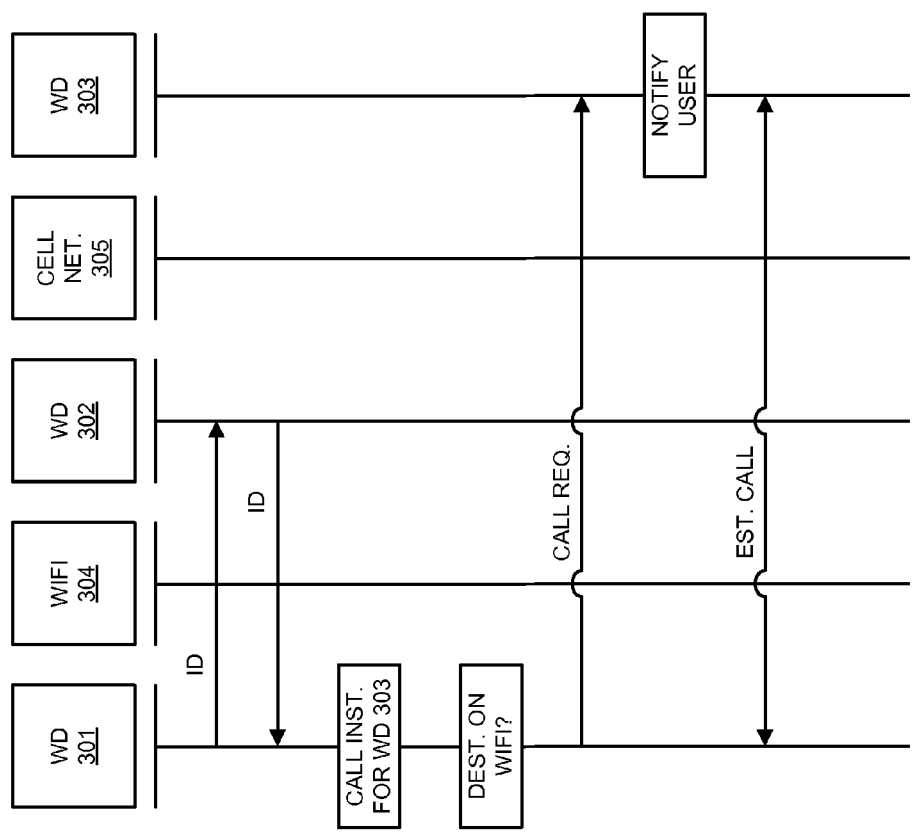
FIG. 5 illustrates an operation of the wireless communication system to provide peer-to-peer wireless device communication over a wireless local area network.

FIG. 5 is a sequence diagram illustrating an operation of wireless communication system 300 to provide peer-to-peer wireless device communication over a wireless local area network. This example begins similarly to the sequence described above with respect to FIG. 4. Specifically, P2P modules 321 and 322 direct their respective wireless devices to broadcast identification information over WIFI network 304. The user of wireless device 301 directs wireless device 301 to establish a call to wireless device 303. P2P module 321 intercepts the call request before the call request can be transferred over cellular network 305 and determines whether wireless device 303 is communicating with WIFI network 304.

In this example, wireless device 303 is not exchanging communications with WIFI network 304 and, therefore, P2P module 321 is unable to find wireless device 303's identification information within its database of identification information for devices communicating with WIFI network 304. Accordingly, P2P module 321 allows the call request to be transferred over cellular network 305 where wireless device 303 will receive a cellular call request, notify its user, and, if instructed to do so by its user, establish a call with wireless device 301 over cellular network 305. Wireless device 301 may communicate directly with cellular network 305 via a cellular wireless link or may communicate with cellular network 305 through WIFI network 304 if WIFI network 304 is in communication with cellular network 305 (e.g. in communication through the Internet).

In the above example, wireless device 303 cannot be reached with a P2P communication over WIFI network 304 because wireless device 303 is not at location 320 and is therefore not in communication with WIFI network 304. However, other situations will result in a similar flow as described in FIG. 5. For example, wireless device 303 may be located within location 320 but is not connected to WIFI network 304, wireless device 303 may not be executing P2P module 323, P2P module 323 may not be installed on wireless device 303, P2P module 323 may operate using a protocol not supported by P2P module 321, or some other reason why other P2P modules would not be able to recognize wireless device 303—including combinations thereof. Similarly, wireless device 301 may be instructed to contact a device that is not a wireless device, such as a Public Switched Telephone Network (PSTN) phone, wired Voice over Internet Protocol (VoIP) phone, or otherwise, and the resources of cellular network 305 may therefore be needed to connect communications to networks for those other types of devices.

Figure 6:
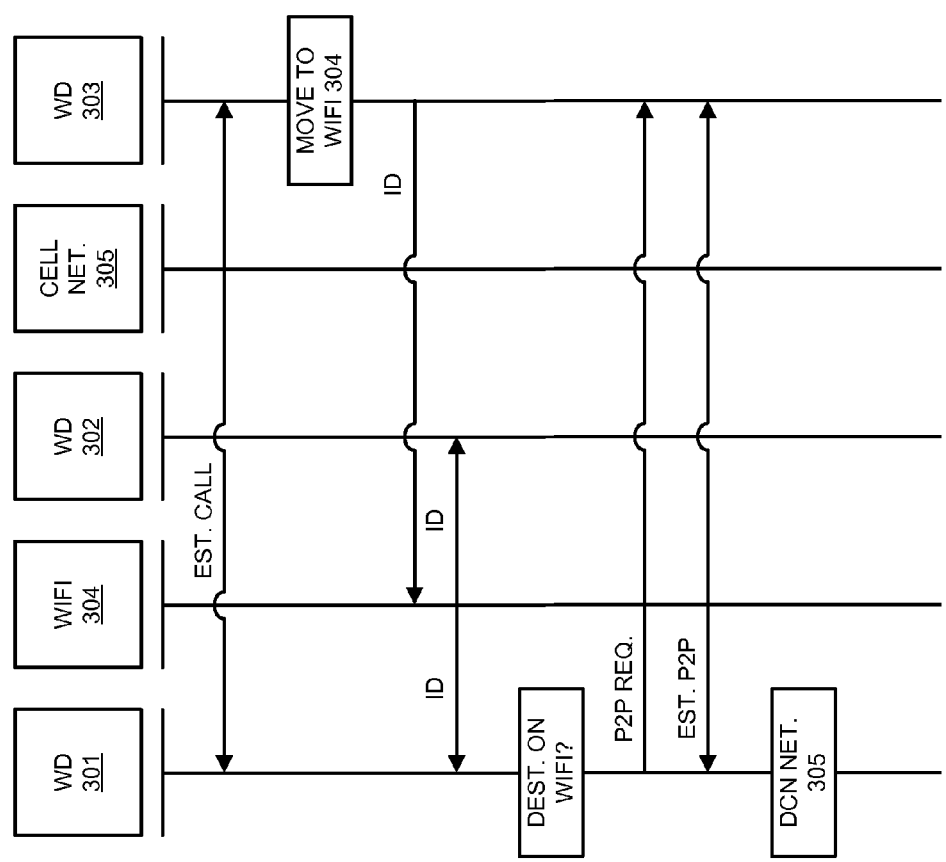
FIG. 6 illustrates an operation of the wireless communication system to provide peer-to-peer wireless device communication over a wireless local area network.

FIG. 6 is a sequence diagram illustrating an operation of wireless communication system 300 to provide peer-to-peer wireless device communication over a wireless local area network. In this example, wireless devices 301 and 303 have established and are currently exchanging call communications over cellular network 305. The call may have been established in the manner described above with respect to FIG. 5. After the call is established and during the call, wireless device 303 moves into location 320, as indicated by the arrow in FIG. 3, and establishes communication with WIFI network 304 over wireless link 316. After connecting to WIFI network 304, P2P module 323 directs wireless device 303 to broadcast its identification information over WIFI network 304 where wireless devices 301 and 302 receive the information. Though not show, wireless devices 302 and 303 may further broadcast their identification information so that P2P module 323 is informed of their presence on WIFI network 304.

After receiving wireless device 303's identification information, P2P module 321 determines that wireless device 303 is the wireless device with which wireless device 301 is currently communicating. In accordance with above examples, P2P module 321 determines that identification information received from wireless device 303 corresponds to information related to the current call. P2P module 321 directs wireless device 301 to transfer a P2P communication request to wireless device 303 over WIFI network 304. Upon receiving the request, P2P module 323 likewise confirms that wireless device 301 is the device with which wireless device 303 is currently exchanging communications and establishes a P2P communication over WIFI network 304.

Once the P2P communication channel has been established over WIFI network 304, the call communications between wireless devices 301 and 303 are transferred from the link through cellular network 305 to the P2P link. The call over cellular network 305 is then disconnected so that resources of cellular network 305 are not longer used for call communications between wireless devices 301 and 303.

It should be understood that, while the above example shows wireless device 301 initiating the call request to switch to P2P communications, P2P module 323 of wireless device 303 may instead initiate the request.

Figure 7:
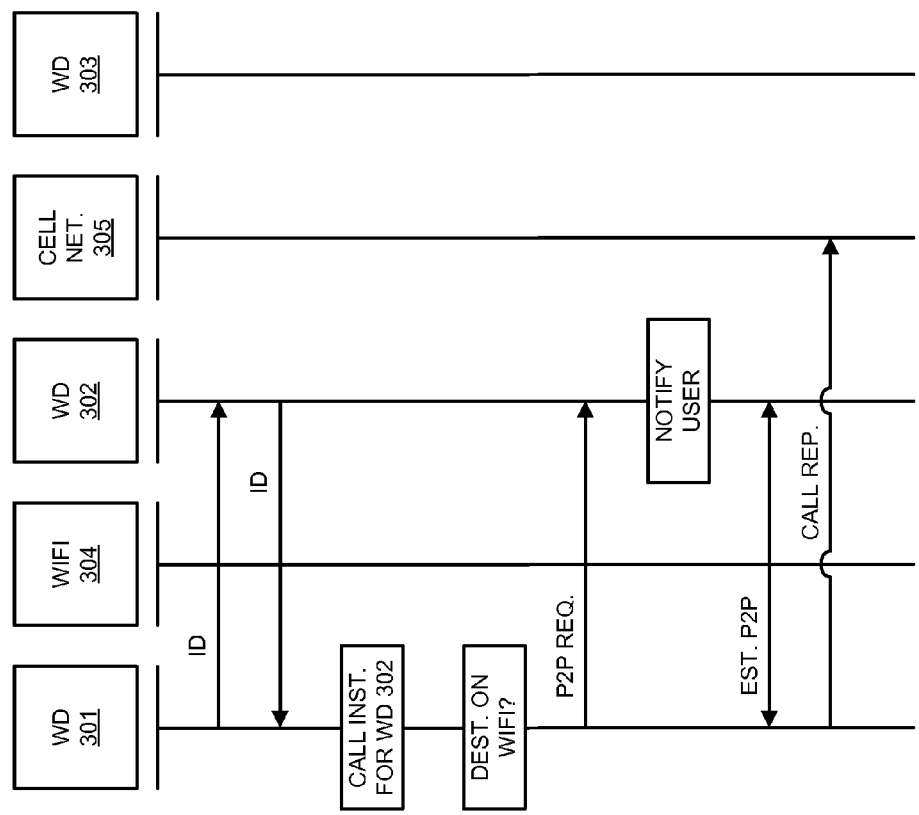
FIG. 7 illustrates an operation of the wireless communication system to provide peer-to-peer wireless device communication over a wireless local area network.

FIG. 7 is a sequence diagram illustrating an operation of wireless communication system 300 to provide peer-to-peer wireless device communication over a wireless local area network. In this example, a P2P communication is established between wireless devices 301 and 302 in the same way described above with respect to FIG. 4. However, after the call is established, P2P module 321 transfers a notification message to cellular network 305. The notification message may identify the wireless devices participating the conversation, a type of call (e.g. voice, text, data, etc.), a duration of the call, or any other type of information that may be of interest to cellular network 305 or its operators. In a specific example, the notification message may include information necessary for the operator(s) of cellular network 305 to comply with a type of regulatory requirement, such as the Communications Assistance for Law Enforcement Act (CALEA). The notification message may be transferred over a wireless link with cellular network 305 or through WIFI network 304 to cellular network 305. In some embodiments, upon receiving the notification, cellular network 305 may determine that call communications should be routed through cellular network 305 and notify wireless devices 301 and 302. Upon being notified of such, P2P modules 321 and 322 begin to route communications through cellular network 305 rather than only on a P2P basis over WIFI network 304.

Figure 8:
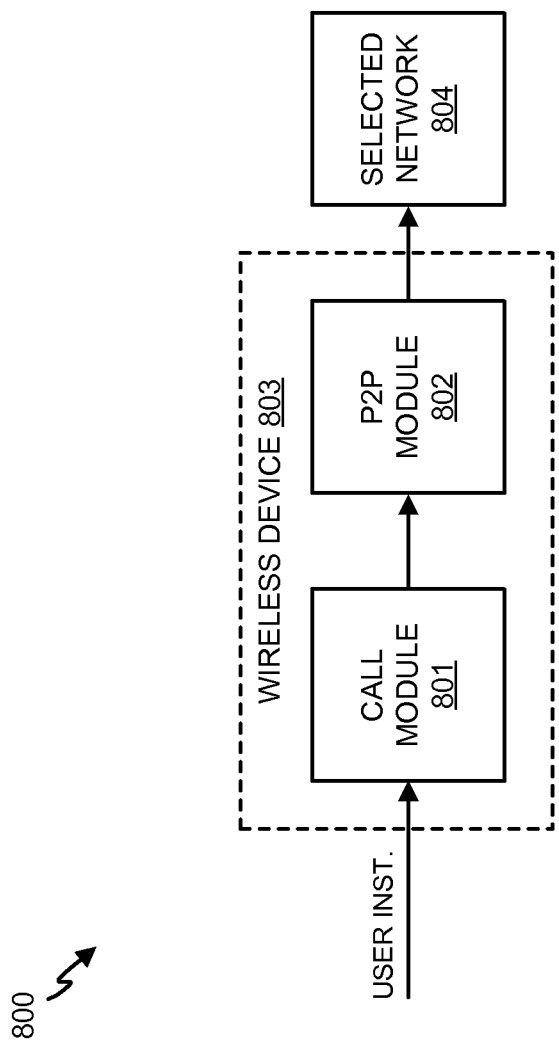
FIG. 8 illustrates a call flow to provide peer-to-peer wireless device communication over a wireless local area network.

FIG. 8 illustrates wireless communication system 800. Wireless communication system 800 includes call module 801 and P2P module 802, which are included in wireless communication device 803. Call modules 801 and P2P module 802 may each be implemented as hardware modules or as software modules executing on processing circuitry of wireless device 803. Call module 801 receives a user instruction to establish a call to a destination. In response to the user instruction, call module 801 initiates an instruction for wireless device 803 to establish the call and that instruction is intercepted by P2P module 802. Upon receiving the instruction from call module 801, P2P module 802 determines whether a device to which the call is directed is located on the same WLAN as wireless device 803. If the destination device is located on the WLAN, P2P module 802 selects the WLAN to initiate the call as a P2P communication with the destination device. If the destination device is not located on the WLAN, P2P module 802 selects a WWAN to initiate the call with the destination. Accordingly, wireless device 803 is instructed by P2P module 802 to initiate the call over the selected network 304.

It should be understood that, while the descriptions above regarding FIGS. 4-8 refer to a voice call being placed between two devices, the same processes can be performed using any type of communications that would typically be routed through cellular network 305, such as text messages, multimedia messages, or any other type of communications service provided by cellular network 305. Effectively, the P2P modules 321-323 provide means to impersonate cellular network 305 to communication applications on wireless devices 301-303 that would typically route communications through cellular network 305 by routing those communications on a P2P basis between two devices on WIFI network 304.

Figure 9:
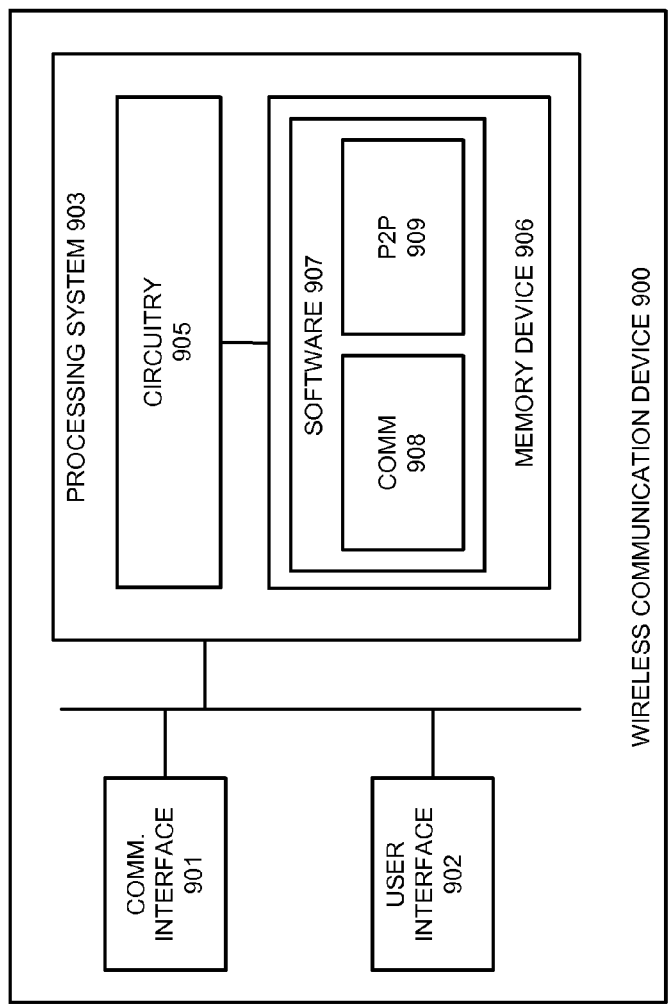
FIG. 9 illustrates a wireless communication device for providing peer-to-peer wireless device communication over a wireless local area network.

FIG. 9 illustrates wireless communication device 900. Wireless communication device 900 is an example of wireless communication device 101, although device 101 could use alternative configurations. Wireless communication device 900 comprises wireless communication interface 901, user interface 902, and processing system 903. Processing system 903 is linked to wireless communication interface 901 and user interface 902. Processing system 903 includes processing circuitry 905 and memory device 906 that stores operating software 907. Wireless communication device 900 may include other well-known components such as a battery and enclosure that are not shown for clarity. Wireless communication device 900 may be a telephone, computer, e-book, mobile Internet appliance, media player, game console, wireless network interface card, or some other wireless communication apparatus—including combinations thereof.

Wireless communication interface 901 comprises RF communication circuitry and at least one antenna. The RF communication circuitry typically includes an amplifier, filter, RF modulator, and signal processing circuitry. Wireless communication interface 901 may also include a memory device, software, processing circuitry, or some other communication device. Wireless communication interface 901 may use various protocols, such as CDMA, EVDO, WIMAX, GSM, LTE, WIFI, HSPA, or some other wireless communication format—including combinations thereof. Wireless communication interface 901 exchanges communications with a wireless wide area communication network (WWAN) and a wireless local area communication network (WLAN).

User interface 902 comprises components that interact with a user to receive user inputs and to present media and/or information. User interface 902 may include a speaker, microphone, buttons, lights, display screen, touch screen, touch pad, scroll wheel, communication port, or some other user input/output apparatus—including combinations thereof. User interface 902 may omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Processing circuitry 905 is typically mounted on a circuit board that may also hold memory device 906 and portions of communication interface 901 and user interface 902. Operating software 907 comprises computer programs, firmware, or some other form of machine-readable processing instructions. Operating software 907 includes communication module 907 and peer-to-peer (P2P) module 908. Operating software 907 may further include an operating system, utilities, drivers, network interfaces, applications, or some other type of software. When executed by processing circuitry 905, operating software 907 directs processing system 903 to operate wireless communication device 900 as described herein.

In particular, communication module 908 directs processing system 903 to receive a request from a user to initiate a communication with a second wireless communication device. P2P module 909 directs processing system 903 to determine whether the second wireless communication device is in communication with the WLAN. Upon determining that the second wireless communication device is in communication with the WLAN, P2P module 909 directs processing system 903 to establish the communication with the second wireless communication device as a peer-to-peer communication over the WLAN via wireless communication interface 901. Upon determining that the second wireless communication device is not in communication with the WLAN, P2P module 909 directs processing system 903 to establish the communication with the second wireless communication device over the WWAN via wireless communication interface 901.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device in communication with a wireless wide area communication network (WWAN) and a wireless local area communication network (WLAN), comprising:
    receiving a request from a user to initiate a communication with a second wireless communication device, and responsively determining whether the second wireless communication device is in communication with the WLAN;
    upon determining that the second wireless communication device is in communication with the WLAN, establishing the communication with the second wireless communication device as a peer-to-peer communication over the WLAN; and
    upon determining that the second wireless communication device is not in communication with the WLAN, establishing the communication with the second wireless communication device over the WWAN.

2. The method of claim 1, further comprising:
    broadcasting identification information for the wireless communication device over the WLAN; and
    receiving identification information for each of a plurality of wireless communication devices in communication with the WLAN.

3. The method of claim 2, wherein determining that the second wireless communication device is in communication with the WLAN comprises:
    determining that identification information for the second wireless communication device corresponds to identification information for one of the plurality of wireless communication devices.

4. The method of claim 2, wherein the identification information for each of the plurality of wireless communication devices expires after a predetermined period of time and further comprising:
    rebroadcasting the identification information for the wireless communication device over the WLAN before the predetermined period of time elapses since the broadcasting of the identification information for the wireless communication device.

5. The method of claim 2, wherein the identification information for the wireless communication device comprises a media access code (MAC) of the wireless communication device.

6. The method of claim 1, further comprising:
    upon establishing the communication with the second wireless communication device over the WLAN, transferring a message to the WWAN that notifies the WWAN of the communication.

7. The method of claim 1, further comprising:
    after establishing the communication with the second wireless communication device over the WLAN, determining that the second wireless communication device is now in communication with the WLAN; and in response to determining that the second wireless communication device is now in communication with the WLAN, establishing the communication as a peer-to-peer communication over the WLAN and removing the WWAN from the communication.

8. The method of claim 1, wherein the request from the user to initiate the communication comprises a request to initiate the communication over the WWAN.

9. The method of claim 1, wherein the WLAN comprises a Wireless Fidelity (WIFI) network.

10. The method of claim 1, wherein the WWAN comprises a cellular communication network.

11. A wireless communication device in communication with a wireless wide area communication network (WWAN) and a wireless local area communication network (WLAN), comprising:

a user interface configured to receive a request from a user to initiate a communication with a second wireless communication device;

in response to the request, a processing system configured to determine whether the second wireless communication device is in communication with the WLAN, a communication interface configured to establish the communication with the second wireless communication device as a peer-to-peer communication over the WLAN upon the processing system determining that the second wireless communication device is in communication with the WLAN and establish the communication with the second wireless communication device over the WWAN upon determining that the second wireless communication device is not in communication with the WLAN.

12. The wireless communication device of claim 11, further comprising:

the communication interface configured to broadcast identification information for the wireless communication device over the WLAN and receive identification information for each of a plurality of wireless communication devices in communication with the WLAN.

13. The wireless communication device of claim 12, wherein the processing system configured to determine that the second wireless communication device is in communication with the WLAN comprises:

the processing system configured to determine that identification information for the second wireless communication device corresponds to identification information for one of the plurality of wireless communication devices.

14. The wireless communication device of claim 12, wherein the identification information for each of the plurality of wireless communication devices expires after a predetermined period of time and further comprising:

the communication interface configured to rebroadcast the identification information for the wireless communication device over the WLAN before the predetermined period of time elapses since the communication interface broadcasted the identification information for the wireless communication device.

15. The wireless communication device of claim 12, wherein the identification information for the wireless communication device comprises a media access code (MAC) of the wireless communication device.

16. The wireless communication device of claim 11, further comprising:

the communication interface configured to transfer a message to the WWAN that notifies the WWAN of the communication upon establishing the communication with the second wireless communication device over the WLAN.

17. The wireless communication device of claim 11, further comprising:

the processing system configured to determine that the second wireless communication device is now in communication with the WLAN after establishing the communication with the second wireless communication device over the WLAN; and the communication interface configured to, in response to determining that the second wireless communication device is now in communication with the WLAN, establish the communication as a peer-to-peer communication over the WLAN and remove the WWAN from the communication.

18. The wireless communication device of claim 11, wherein the request from the user to initiate the communication comprises a request to initiate the communication over the WWAN.

19. A non-transitory computer readable medium having instructions stored thereon for operating a wireless communication device in communication with a wireless wide area communication network (WWAN) and a wireless local area communication network (WLAN), the instructions, when executed by the wireless communication device, direct the wireless communication device to:

receive a request from a user to initiate a communication with a second wireless communication device, and responsively determine whether the second wireless communication device is in communication with the WLAN;

upon determining that the second wireless communication device is in communication with the WLAN, establish the communication with the second wireless communication device as a peer-to-peer communication over the WLAN; and upon determining that the second wireless communication device is not in communication with the WLAN, establish the communication with the second wireless communication device over the WWAN.

20. The non-transitory computer readable medium of claim 19, wherein the instructions further direct the wireless communication device to:

broadcast identification information for the wireless communication device over the WLAN; and receive identification information for each of a plurality of wireless communication devices in communication with the WLAN.

* * * * *